Oct. 20, 1953 D. K. HOLM 2,655,814
GUIDE DEVICE FOR INDUSTRIAL FLAT BELTS, ROPES OR THE LIKE
Filed Aug. 29, 1950
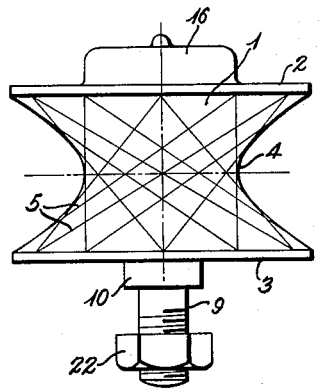
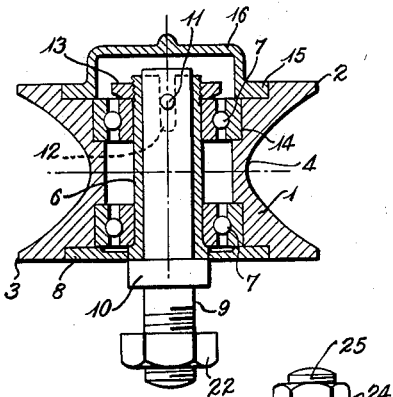
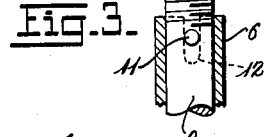
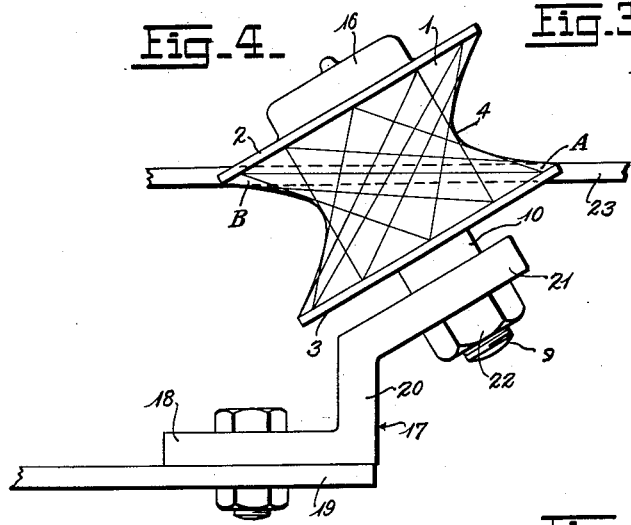
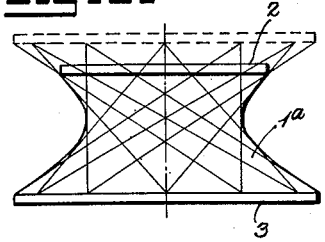
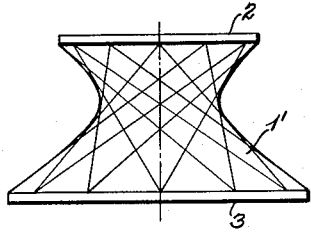
INVENTOR
*Danckert Krohn Holm*
BY *Stevens, Davis, Miller and Mosher*
ATTORNEYS Patented Oct. 20, 1953

2,655,814

UNITED STATES PATENT OFFICE 2,655,814

GUIDE DEVICE FOR INDUSTRIAL FLAT BELTS, ROPES, OR THE LIKE

Danckert Krohn Holm, Oslo, Norway

Application August 29, 1950, Serial No. 182,065
In Norway August 26, 1949

5 Claims. (Cl. 74—240)

The present invention relates to a guide device for ropes, band webs, and industrial belts such as driving belts, conveyor belts etc.

Belts of any considerable length to be used for industrial purposes always need guide arrangements. The guiding effect is most commonly obtained by using a pulley or a plurality of corresponding driving pulleys which are transversally curved, whereby the belt will be subjected to the greatest strain on the highest portion of the curvature, thereby keeping itself in position.

A guiding effect also may be obtained by the driving or carrying pulleys being more or less automatically adjusted while running, and wedge-shaped belts as well as ropes are guided in specially designed V-shaped grooves.

A special kind of belt-guiding effect is obtained by edge guiding, which operates by the belt edge, while running out of alignment, abutting against rollers, which are cylindrical or provided with V-shaped grooves.

The present invention relates to the latter kind of guide devices, which are arranged to be engaged by the edges of the belt and includes the provision of a guide pulley that has a groove or guiding surface of hyperbolical cross sectional configuration and which is mounted relative to the belt edge so that the belt edge engages the groove or guiding surface in line contact along a rectilinear generatrix. The roller is preferably positioned in a plane oblique to the path of movement of the belt and the edge of the belt engages the groove along a rectilinear generatrix with the purpose of distributing the relative pressure along a greater area of the roller and belt edge so that a reduced wear of the roller and belt edge is obtained.

To more clearly demonstrate the principle of this invention, consider that there are two parallel and coaxial circles, which are drivingly interconnected by a finely meshed system of parallel threads extending between the peripheries of the circles to form a cylinder, the threads constituting the generatrices on the cylinder surface. If one of the circles is turned clockwise and the other circle is turned counter-clockwise, the circles being turned relatively to each other, the cylinder surface will become a hyperbolical surface, where the threads are still rectilinear but oblique to the axis of the cylinder. Suppose, further, that said hyperbolical surface is placed along a line, in the present case one of the edges of the belt, in such manner that the edge of the belt coincides with a generatrix of the hyperbolical surface, then a complete contact will be obtained along the hyperbolical surface. In this instance, the hyperbolical surface is the guiding surface or groove in the pulley or roller.

The difference between the instant pulley and a conventional pulley with a cylindrical or V-shaped groove is comperable in principle to the advantage of a roller bearing compared with a ball bearing.

In a V-grooved pulley or cylindrical pulley, the edge of the belt touches the groove or surface in point contact and with steel belts, the edge of the belt gouges the groove and forms a slot or trough, which is transverse to the axis of the pulley. Additionally, such point contact causes the edges of leather and the like belts to wear.

From the instant invention is derived the advantages that the line contact obviates wear on the side edges of the belt and also the pressure is distributed over the guiding surface or groove in the roller and over the edge of the belt so as to obviate the formation of any distinctive trough or slot in the groove. Instead, the groove is worn down uniformly but still maintains its hyperbolical cross sectional configuration. Only the dimensions are reduced.

The edge of the belt is carried, at first contact with the pulley, only by the side of the groove in the pulley then is embraced by the always rising edge of a hyperbolical surface until the latter edge gradually is curving over the edge of the belt and gradually touching the edge of the belt on the upper side thereof. Therefore, the edge of the belt will be constantly passing a substantially funnel shaped and always more narrowed space, the side movements of the belt edge thus being stopped. In this regard, the pulleys are disposed on opposite sides of the belt, so that the edges of the belt will engage the grooves or guiding surfaces in the pulleys and the belt will be guided free from lateral displacement.

Another feature of this invention is to provide means whereby such a pulley, having a groove of hyperbolical cross sectional configuration, is displaceable axially within certain limits so that the pulley will, over a rather large space, keep the belt edge in position. In this regard, the belt edge must be capable of performing certain vibrating movement or of moving perpendicularly between the driving and carrying pulleys. The pulley, being mounted for axial movement, can move with the belt during its vibrating movement and the pulley will center about the point of attack of the highest pressure along the entire extension of the axial displaceability.

The invention is illustrated by way of example in the accompanying drawing, in which:

Figure 1 is a side view of the grooved pulley,

Figure 2 is an axial sectional view of the pulley,

Figure 3 is a detail of same,

Figure 4 shows the grooved pulley after being placed in guiding position,

Figure 5 shows an alternative embodiment of the grooved pulley, and

Figure 6 shows another embodiment of the pulley.

In the accompanying drawing, a guide pulley 1, constructed in accordance with the principles of this invention, is illustrated and includes ends 2 and 3 between which is formed a groove or guiding surface 4 of hyperbolical cross sectional configuration. In other words, the guide pulley 1 has a hyperbolical pulley surface 4, which is adapted to engage the side edges of a flat industrial belt, rope or the like and guide the belt between its driving and carrying pulleys to prevent lateral displacement of the belt. On the groove or guiding surface 4 are depicted for explanatory purposes a set of generatrices 5.

The pulley 1 is mounted on a sleeve 6 by ball bearings 7, the inner end of the sleeve having a radial flange 8 that underlies the inner set of ball bearings. The sleeve 6 is mounted on a shaft 9, with the flange 8 adapted to seat on a shoulder 10 formed on the shaft. A pin 11 is transversely mounted through the shaft 9 adjacent its outer end and the ends of the pin 11 radiate from the shaft and are engaged in axial slots 12 formed in diametrically opposed portions of the sleeve and extending through the outer end thereof. The pin and slot arrangement secures the sleeve on the shaft so that the sleeve cannot rotate but can move axially relative to the shaft 9. The pulley is thus mounted on the shaft 9 for free rotary movement and for limited axial movement. The axial movement of the pulley outwardly of the shaft is limited by the engagement of the pin ends with the inner closed ends of the slots 12 and the inward axial movement of the pulley is arrested by the shoulder 10 on the shaft 9.

A locking nut 13 is secured on the outer ends of the sleeve and retains the outer set of ball bearings in the seat 14, the nut cooperating with the radial mounting flange 15 of the sealing cap 16, which encloses the outer ends of the shaft and sleeve. The flange 15 is seated in a recess formed in the outer end 2 of the pulley. The cap 16 encloses the outer end of the bore of the pulley and provides a seal with the flange 8 for lubrication for the ball bearings.

In Figure 4, a mounting means for the pulley 1 is illustrated and includes a bracket 17 that has an inner end 18 which parallels the plane of the belt and is suitably mounted on a support 19, which may be a part of the frame of the conveying or power transmitting device (not shown) that employs the belt. A connecting portion 20 extends at right angles from the inner end 18 and supports the outer end 21 of the bracket to which the shaft 9 is secured. The shaft 9 extends through the end 21 and is affixed by the nut 22, which cooperates with the shoulder 10 to locate the shaft against axial movement relative to the supporting end 21 of the bracket.

It will be noted that the shaft 9 is at right angles to the outer end 21 of the bracket which extends obliquely from the connecting portion 20 of the bracket, so that the pulley 1 is disposed in a plane oblique to the plane of the belt reach or path of movement of the belt reach, which edge 23 (shown in dotted lines) it is to guide. The edge 23 engages the groove 4 from point A to point B on the groove, so that it engages in line to line contact along a rectilinear generatrix 5 of the groove.

As will be understood, only a point of an edge of a belt touches the groove or guiding surface of a conventional cylindrical or V-grooved pulley, the pulley lying in a plane normal to the path of movement of the belt. With such an arrangement, there is point contact between the groove and the edge of the belt and, as a result, the groove of the pulley, especially with steel belts, is constantly being worn to the end that a trough or depression is formed in the groove. Also, such point contact places a considerable strain on the edge of a belt, since there is not a distribution of pressure between the groove and the belt edge.

Such defects are obviated by the pulley 1, which has the groove 4 of hyperbolical cross sectional configuration and which is mounted so that the edge 23 of the belt engages the groove in line contact from point A to B and along a rectiliner generatrix of the groove. Such line to line contact enables the pressure contact between the groove and belt edge to be spread out over more of the belt edge and throughout more of the groove. Furthermore, it will be particularly noted that since the belt edge touches the groove along a rectilinear generatirix of the hyperbolical surface, the groove, while being worn down, will be reduced possibly in dimension but will always maintain its hyperbolical surface. Thus, there is no possibility that a trough or depression can be formed in the groove, since the groove will be worn down evenly throughout its surface and the hyperbolical cross sectional configuration will always be maintained.

In Figure 3, means is provided for adjusting the axial displacement of the sleeve and includes a nut 24, which is threaded on a threaded extension 25 of the shaft 9. The axial movement of the sleeve outwardly on the shaft 9 is thus limited by the nut 24, prior to the engagement of the ends of the pin 11 in the closed ends of the slots 12. The axial displacement may be thus adjusted by screwing the nut 24 further on or further off the end extension 25 on the shaft 9.

Such axial displacement of the pulley relative to the fixed shaft 9 is desirable, since the belt has a tendency to vibrate and effect a perpendicular displacement. The belt edge 23, while in normal position, will touch that portion of the groove 4, which has the smallest diameter, so that under normal conditions the belt edge will lift the pulley upwards, in case the belt moves upwardly and the belt edge will keep it suspended. The pulley 1 will thus follow the vibratory movement of the belt reach and respond to such, so that the belt edge is always disposed relative to the pulley for guided engagement therewith.

As most of the belts are provided with belt lacings (not shown), which generally are placed on the upper side of the belt, this may have an undesired effect at the running off place of the grooved pulley, because the upper edge 2 of the pulley will be curved rather closely above the belt just in the same manner as the edge of the pulley, at the running off place, will be lying below the belt, thereby carrying the same towards the guiding surface. The running off place is noted in Figure 4 at B. Thereby, a knocking will take place between the belt lacing and the edge 2 of the belt at the running off place B.

In cases where such things may prevail, the hyperbolical surface of the belt guide may have a smaller diameter in one end than in the other. Thus, for example, with reference to Figure 6, the upper end 2 will be of a smaller diameter than the inner end 3 of the pulley 1'. Or, as shown in Figure 5, the height of the pulley may be lessened, maintaining the generatrix system of the hyperboloid, with the upper end 2 being of smaller diameter than the lower end 3 of the pulley 1a.

I claim:

1. A conveyor or transmission mechanism comprising a flat belt, guide means for an edge of the belt comprising a pulley having a groove of hyperbolical cross sectional configuration, and means mounting the pulley so that an edge of the belt touches the groove in line contact along a rectilinear generatrix of the groove.

2. In combination with a conveyor or transmission system including a flat belt, a pulley having a grooved guiding surface of hyperbolical cross section and means mounting the pulley so that an edge of the belt touches the guiding surface in line contact along a rectilinear generatrix of the surface, and so that the axis of the pulley lies on a line oblique to a line along the path of movement of the belt edge and so that said pulley is axially displaceable consequent with perpendicular displacement of the belt.

3. In a conveyor or transmission system which includes a flat belt, a guide pulley for an edge of the belt having a groove of hyperbolical cross sectional configuration, said pulley being mounted relative to an edge of the belt so that the edge touches the groove in line contact along a rectilinear generatrix of the groove, and the axis of said pulley lying in a line that is oblique to a line along the path of movement of the belt edge.

4. In a conveyor or transmission system which includes a flat belt, a guide pulley for an edge of the belt having a groove of hyperbolical cross sectional configuration, said pulley being mounted relative to an edge of the belt so that the edge touches the groove in line contact along a rectilinear generatrix of the groove, and the axis of said pulley lying in a line oblique to a line along the path of movement of the belt edge, and means mounting the pulley for axial displacement consequent with perpendicular displacement of the belt.

5. In a conveyor or transmission system which includes a flat belt, a guide pulley for an edge of the belt having a groove of hyperbolical cross sectional configuration, said pulley being mounted relative to said edge of the belt so that the edge touches the groove in line contact along a rectilinear generatrix of the groove, and the axis of the pulley lying in a line oblique to a line along the path of movement of the belt edge, said pulley having opposing ends of different diameters.

DANCKERT KROHN HOLM.

References Cited in the file of this patent

UNITED STATES PATENTS

| Number | Name | Date |
|---|---|---|
| 13,429 | Gesner | Aug. 14, 1855 |
| 169,573 | Parr | Nov. 2, 1875 |
| 677,333 | Bartholomew | July 2, 1901 |
| 688,173 | Hermsdorf | Dec. 3, 1901 |
| 762,334 | Monin | June 14, 1904 |
| 1,144,767 | Ladinski | June 29, 1915 |
| 2,532,987 | Berndt | Dec. 5, 1950 |